(12) United States Patent
Feng et al.

(10) Patent No.: US 7,312,898 B2
(45) Date of Patent: Dec. 25, 2007

(54) TRANSFORMATION OF AN INPUT IMAGE TO PRODUCE AN OUTPUT IMAGE

(75) Inventors: Guotong Feng, West Lafayette, IN (US); Michael George Fuchs, Boise, ID (US); Charles A. Bouman, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1020 days.

(21) Appl. No.: 10/285,100

(22) Filed: Oct. 31, 2002

(65) Prior Publication Data
US 2004/0085585 A1    May 6, 2004

(51) Int. Cl.
H04N 1/409 (2006.01)
H04N 1/40 (2006.01)

(52) U.S. Cl. ............ 358/2.1; 358/3.21; 358/3.22; 358/3.27

(58) Field of Classification Search ......... 382/300, 382/199, 205, 260, 173, 176, 266, 190, 195; 358/1.2, 525, 528, 451, 2.1, 3.27, 474, 529, 358/1.9, 447, 448, 465, 466, 462–464, 3.21, 358/3.22
See application file for complete search history.

(56) References Cited

U.S. PATENT DOCUMENTS

| | | | |
|---|---|---|---|
| 5,272,764 A | 12/1993 | Bloomberg et al. | |
| 5,767,978 A | 6/1998 | Revankar et al. | |
| 5,812,702 A | 9/1998 | Kundu | |
| 6,298,151 B1 | 10/2001 | Jodoin et al. | |
| 6,373,981 B1 | 4/2002 | de Queiroz et al. | |
| 6,400,844 B1 | 6/2002 | Fan et al. | |
| 6,426,809 B1* | 7/2002 | Hayashi et al. | 358/529 |
| 6,549,658 B1* | 4/2003 | Schweid et al. | 382/173 |
| 7,054,507 B1* | 5/2006 | Bradley et al. | 382/300 |
| 2002/0081023 A1* | 6/2002 | Uchida | 382/165 |
| 2004/0085592 A1* | 5/2004 | Feng et al. | 358/3.27 |

FOREIGN PATENT DOCUMENTS

EP    1223552    7/2002

OTHER PUBLICATIONS

P. Li and J. P. Allebach, *Tone Dependent Error Diffusion*, Color Imaging: Device Independent Color, Color Hardcopy, and Applications VII, R. Eschbach and G. G. Marcu, eds, SPIE vol. 4663, San Jose, CA Jan. 22-25, 2002, pp. 310-321.
A.K. Jain, "Fundamentals of Digital Image Processing" 1989, Prentice-Hall, USA, NJ, XP00225905, pp. 351-353.

* cited by examiner

Primary Examiner—Cheukfan Lee

(57) ABSTRACT

An input image is transformed to produce an output image. First pixels occurring at edges within the input image are detected. Second pixels that are part of text within the input image are also detected. The first pixels and the second pixels are combined to produce the output image.

33 Claims, 2 Drawing Sheets

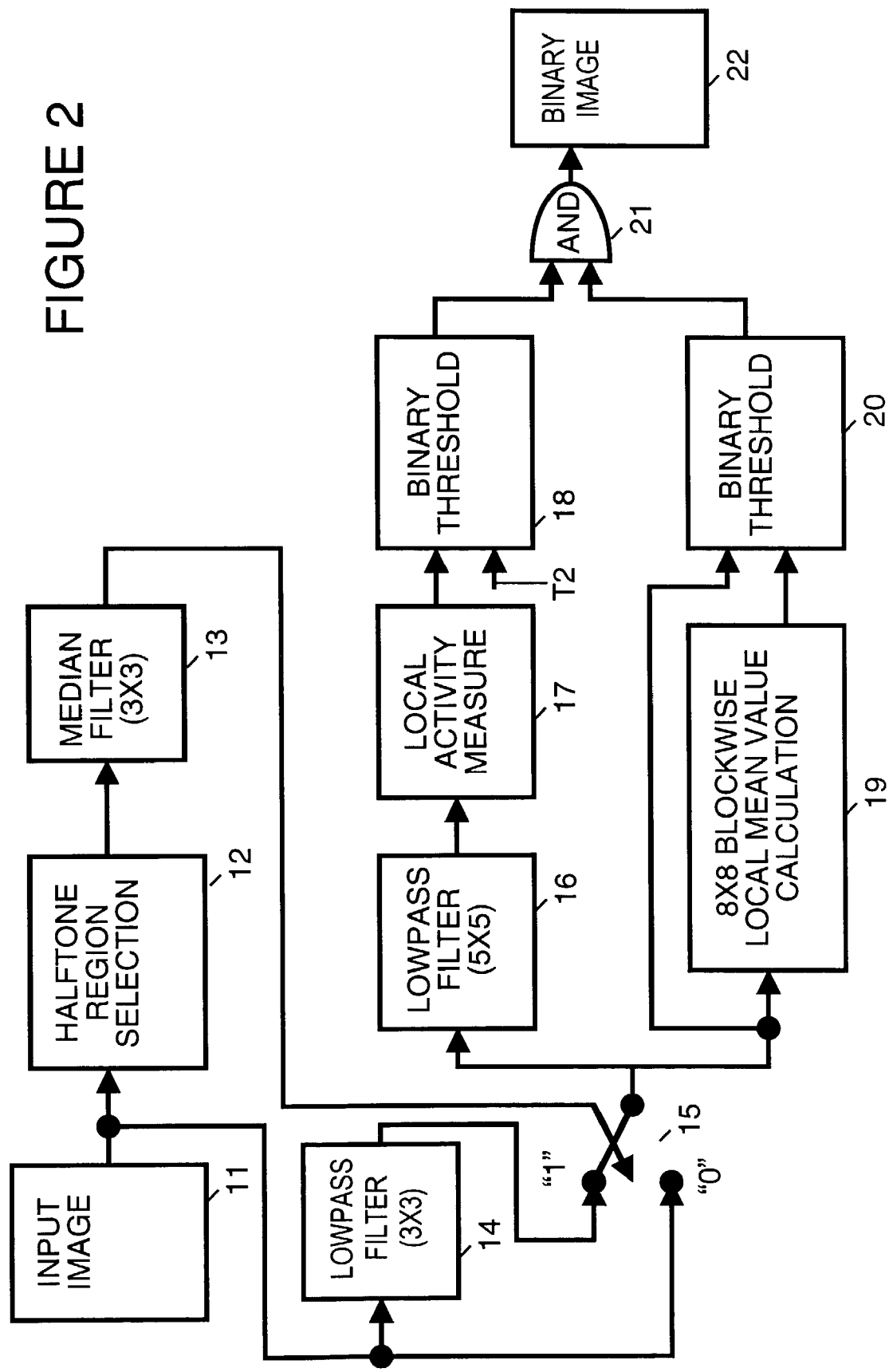

TRANSFORMATION OF AN INPUT IMAGE TO PRODUCE AN OUTPUT IMAGE

BACKGROUND

A digital sender is a system designed to obtain documents (for example by scanning), convert the documents to a chosen format and route the formatted document to a desired destination or destinations using an available communication protocol. Digital senders generally support a variety of document types, a variety of data formats, and a variety of communication protocols.

Examples of typical document formats include tagged image file format (TIFF), multipage TIFF (MTIFF), portable document format (PDF), and joint picture experts group (JPEG). Examples of typical communication methods include computer networks and facsimile transmission (fax).

Documents can be classified based on content. For example, text documents typically contain black text on a white background. Formats used to transmit text documents typically are optimized to provide for crisp edges to effectively define characters. Traditional fax is designed to efficiently transmit text (black text on a white background) documents.

Graphics documents typically contain color or grayscale images. Formats used to transmit continuous tone images, for example, continuous tone color photographs, can be very effectively represented using the JPEG format.

Mixed content documents typically include a combination of text and graphic data. These documents often require more specialized solutions because existing formats used for transmission and storage of image data are optimized for use with either black and white text, or with continuous tone images.

The current TIFF specification supports three main types of image data: black and white data, halftones or dithered data, and grayscale data.

Baseline TIFF format can be used to store mixed content documents in black and white (i.e. binary) formats. Baseline TIFF format supports three binary compression options: Packbits, CCITT G3, and CCITT G4. Of these, CCITT G3, and CCITT G4 compression are compatible with fax machines.

Halftoning algorithms, such as error diffusion, can be used to create a binary representation of (i.e. binarize) a continuous tone image. Such an image can be subsequently compressed using CCITT G3, and CCITT G4 compression so they are suitable for fax transmission. However, CCITT G3 compression, and CCITT G4 compression generally do not provide for the desired compression ratios for halftone images. Therefore CCITT G3, and CCITT G4 compression of halftone mixed content documents results in large file sizes and subsequently very long fax transmission times.

A binary representation of an input document can be created by performing a binary threshold operation using a constant threshold for the entire image. However, when CCITT G3/G4 compression is performed on such a document, there is generally unsatisfactory representation of continuous tone document content and color text on color background. Likewise, when halftoning an input document using error diffusion such as Floyd Steinberg, with CCITT G3/G4 compression, this can result in inadequate compressibility of halftone using G3 and G4 (i.e. fax) compression.

SUMMARY OF THE INVENTION

In accordance with the preferred embodiment of the present invention, an input image is transformed to produce an output image. First pixels occurring at edges within the input image are detected. Second pixels that are part of text within the input image are also detected. The first pixels and the second pixels are combined to produce the output image.

BRIEF DESCRIPTION OF THE DRAWINGS

FIG. 2 is a block diagram that illustrates the placement of a document in a format that provides a representation of binary mixed document content with improved compressibility in accordance with an embodiment of the present invention.

DESCRIPTION OF THE PREFERRED EMBODIMENT

Figure 1:
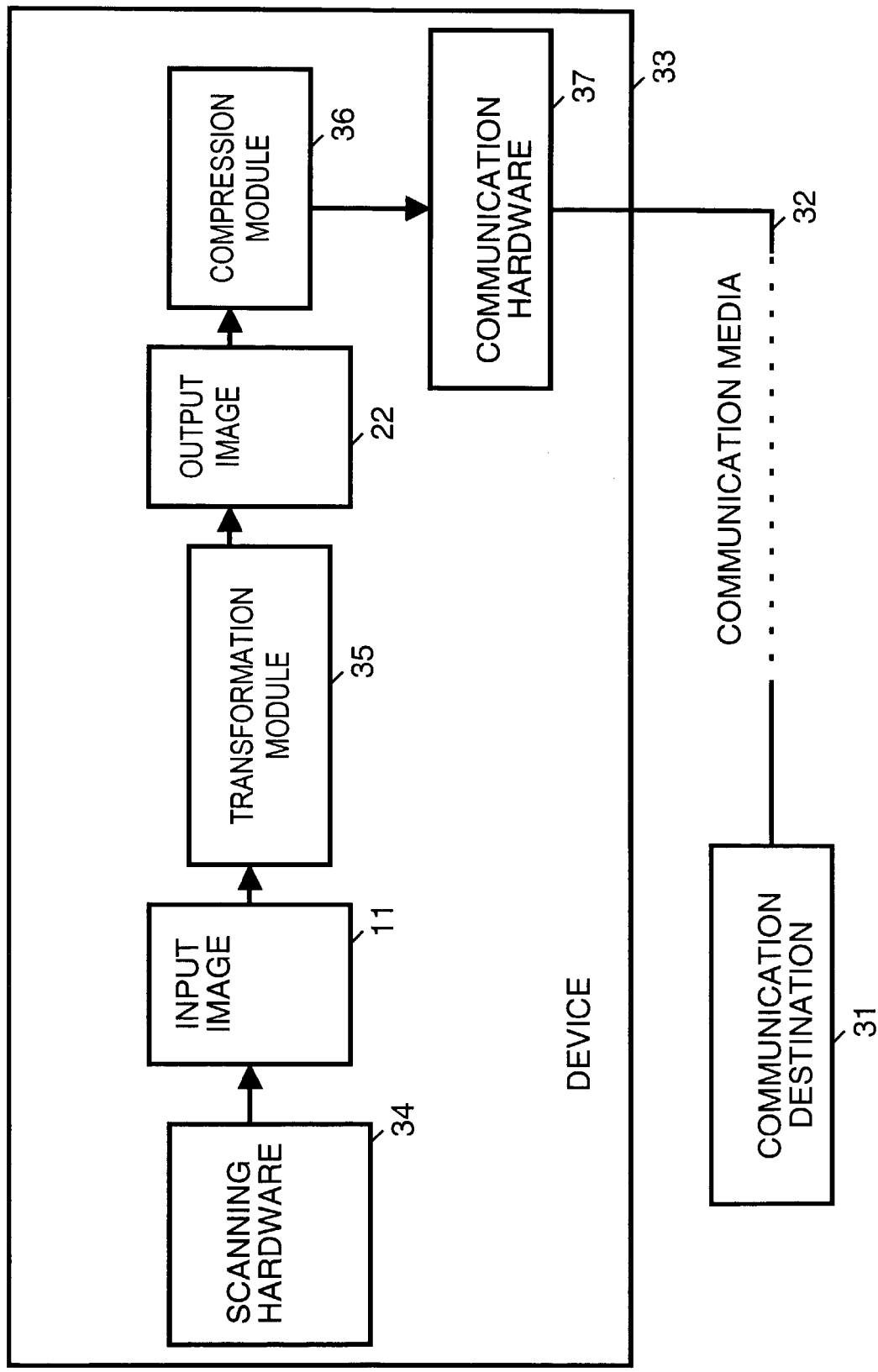
FIG. 1 is a block diagram of a device.

FIG. 1 is a simplified block diagram of a device 33. Device 33 is, for example, a digital sender such as a scanner, a fax machine or some other device that sends information in digital form. Alternatively, device 33 can be any device that handles image information, such as a printer or a copier.

Device 33 includes, for example, scanning hardware 34 that performs a scan to produce an input image 11. Input image 11 could, for example, be obtained in other ways such as by an access from an information storage device. Also, input image 11 is, for example, a grayscale image. Alternatively, input image 11 is a color image or another type of image that can be generated by scanning hardware 34 or accessed by some other means.

A transformation module 35 transforms input image 11 to produce a transformed image 22. For example, transformed image 22 is a binary image and transformation module 35 binarizes input image 11 to produce transformed image 22. Alternatively, transformed image 22 is a multi-level image and transformation module 35 uses a multilevel process to transform input image 11 in order to produce transformed image 22.

Transformation module 35 can be implemented in a number of different ways, for example by a processor and firmware, by software or within an application specific integrated circuit (ASIC).

A compression module 36 is used to perform compression on output image 22 in preparation for sending, through communication hardware 37, to a communication destination 31 via communication media 32. Communication media 32 can be, for example, a metal wire, optical media or a wireless communication media.

FIG. 2 is a simplified block diagram that illustrates operation of transformation module 35. Transformation module 35 produces a document in a format that provides accurate representation of binary mixed document content with improved compressibility. In essence, transformation module 35 operates by extracting text edges and graphic outline from the background of a document using locally adaptive binary thresholding techniques.

Input image 11 can be represented in raster format as set out in Equation 1 below:

$$0 \leq g[m,n] \leq 1 \qquad \text{Equation 1}$$

g[m,n] represents the shading at a two dimensional pixel location [m,n] within input image 11 with, for example, "0" being equal to white and "1" being equal to black.

In a halftone region selection block 12, input image 11 is evaluated to select halftone regions within input image 11. In a halftone region selection block 12, for each pixel [m,n], d[m,n] is calculated where d[m,n] is equal to "0" if the pixel is in a non-halftone region and is equal to "1" if the pixel is in a halftone region. d[m,n] is calculated in accordance with Equation 2 set out below:

$$d[m,n]=u(T1-|g[m,n]-0.5|) \qquad \text{Equation 2}$$

In Equation 2 above, T1 is a preselected threshold value and the function u(x) is equal to 1 if (x>0) and is equal to 0 if (x<0). In essence then, if shading at pixel (m,n) is close to white ("0") or black ("1") d[m,n] is equal to 0 (non-halftone), otherwise, d[m,n] is equal to 1 (halftone).

Median filter block 13 represents a median filter operation where median filtering is performed on the binary image output from halftone region selection block 12 by using three by three (3×3) matrices of pixels in order to remove noise and to make a determination as whether the pixel centered in each 3×3 matrix is to be regarded as in a halftone region (1) or in a non-halftone region (0).

The "0" or "1" value for each pixel generated by median filter block 13 is used to control a switch 15. Switch 15 makes a selection based on whether the pixel is regarded as in a halftone region or in a non-halftone region. If the pixel of input image 11 is regarded as in a non-halftone region, then switch 15 selects to take the pixel to be processed without filtering. If the pixel of input image 11 was determined by median filter block 13 to be in a halftone region, then switch 15 selects to receive the pixel of input image 11 after being processed by a lowpass filter 14. Lowpass filter 14 performs a 3×3 lowpass filtering operation on each pixel of input image 11 that is determined in median filter block 13 to be halftone in order to remove background noise and undesired halftone textures. The switching performed by switch 15, controlled by median filter block 13, is beneficial because it allows fine edge detail to be preserved while still removing undesirable halftone textures from input image 11.

After switch 15, the resulting image is processed through two independent binary thresholding processes. In a first binary thresholding process, the resulting image at switch 15 is processed by a 5×5 lowpass filter 16. Lowpass filter 16 filters the image using five by five (5×5) matrices of pixels from the image.

A local activity measure block 17 computes a local activity measure (e[m,n]) for every pixel [m,n]. The local activity measure (e[m,n]) for each pixel [m,n] is equal to the local difference of each pixel from the output of lowpass filter 16 for a 3×3 matrix that contains the pixel.

A binary threshold block 18 compares the local difference value e[m,n] for each pixel to a constant threshold T2, creating the binary image output of the first binary thresholding process. The binary value b1[m,n] assigned to each pixel [m,n] can be calculated in accordance with Equation 3 set out below:

$$b1[m,n]=u(e[m,n]-T2) \qquad \text{Equation 3}$$

In Equation 3 above, T2 is a preselected threshold value and the function u(x) is equal to 1 if (x≧0) and is equal to 0 if (x<0). In essence then, for e[m,n]≧T2, b1[m,n]=1. Otherwise, b1[m,n]=0. For example, constant threshold T2 has a value of 0.02.

The first binary thresholding process detects edges that represent detail within the input image. The edges include edges of graphics and text. The pixels that form the edge regions are separated from uniform fill and background. However, the first binary thresholding process tends to blur sharp edges, so it tends to distort the shape of fine text structures. This generally causes the strokes of letters to look wider than the original letters.

In a second binary thresholding process performed after switch 15, 8×8 blockwise local mean value calculation block 19 calculates a local mean value (T[m/8,n/8]) for blocks of pixels arranged in eight by eight (8×8) matrixes of pixels. The local mean value (T[m/8,n/8]) of each block is used by a binary threshold block 20 to perform a binary threshold calculation of all the pixels in that block. The binary value b2[m,n] assigned to each pixel [m,n] can be calculated in accordance with Equation 4 set out below:

$$b2[m,n]=u(f[m,n]-T[m/8,n/8]) \qquad \text{Equation 4}$$

In Equation 4 above, T[m/8,n/8] is a calculated threshold value and the function u(x) is equal to 1 if (x≧0) and is equal to 0 if (x<0). f[m,n] is the shading value for each pixel [m,n] after switch 15. In essence then, for f[m,n]≧T[m/8,n/8], b2[m,n]=1. Otherwise, b2[m,n]=0.

The second binary thresholding process does not accurately separate edge regions from regions of uniform fill, but it does produce binary images with relatively sharp and precise edge detail. The second binary thresholding process thus detects pixels that are part of text within the input image.

A logical AND block 21 combines the output from binary threshold block 18 with binary threshold block 20 at every pixel to produce output image 22. Output image 22 contains relatively sharp text edges because the text and graphic outlines are detected and separated from the background. The resulting "cartoon-like" representation substantially reduces the entropy of mixed content documents so that the G3/G4 compression algorithms can achieve improved compressibility. The result is a computationally efficient process that produces a reduced compressed file size.

The preferred embodiment of the present invention provides a flexible and efficient solution for mixed halftone and non-halftone TIFF documents that are compressed using the Fax (CCITT G3/G4) compression standard. The preferred embodiment of the present invention also provides a representation of binary mixed document content with improved compressibility using CCITT G3/G4 compression. This is a significant improvement over performing binary thresholding of an input document using a constant threshold for the entire image and CCITT G3/G4 compression. This is also a significant improvement over halftoning an input document using error diffusion such as Floyd Steinberg, with CCITT G3/G4 compression.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure is intended to be illustrative, but not limiting, of the scope of the invention, which is set forth in the following claims.

We claim:

1. A method for transforming an input image to produce an output image, the method comprising the following:
   (a) detecting first pixels occurring at edges which represent detail within the input image, the edges including edges of graphics and text within the input image and not including uniform fill and background within the graphics;
   (b) detecting second pixels that are part of text within the input image; and, (c) combining the first pixels and the second pixels to produce the output image so that the output image includes the text and the edges of graphics but excludes uniform fill and background within the graphics.

2. A method as in claim 1 wherein step (a) includes performing a threshold process in which a local activity measure is calculated for each pixel of the input image.

3. A method as in claim 1 wherein step (b) includes performing a threshold process in which for each pixel of the input image a local mean value for a block of pixels that contain the pixel is used as a threshold.

4. A method for transforming an input image to produce an output image, the method comprising the following:
 (a) performing a first threshold process in which a local activity measure is calculated for each pixel of the input image, wherein performance of the first threshold process results in a first representation of the input image;
 (b) performing a second threshold process in which for each pixel of the input image a local mean value for a block of pixels that contain the pixel is used as a threshold, wherein performance of the second threshold process results in a second representation of the input image; and,
 (c) combining the first representation of the input image and the second representation of the input image to produce the output image.

5. A method as in claim 4 wherein the method additionally comprises the following step performed before step (a) and step (b):
 filtering portions of the input image detected as halftone image to remove undesired halftone textures.

6. A method as in claim 4 wherein step (a) includes the following:
 obtaining, for each pixel of the input image, a local difference between a shading value for the pixel and output from a lowpass filter that filters a matrix of pixels that includes the pixel, the local difference being the local activity measure for the pixel.

7. A method as in claim 4 wherein step (a) includes the following performed for each pixel of the input image:
 obtaining, for the pixel, a local difference between a shading value for the pixel and output from a lowpass filter that filters a matrix of pixels that includes the pixel, the local difference being the local activity measure for the pixel; and,
 comparing the local activity measure for the pixel with a preselected threshold to obtain a value for the pixel.

8. A method as in claim 4 wherein step (b) includes the following:
 obtaining, for each block of pixels, a blockwise local mean shading value; and,
 for every pixel within each block of pixels, using the blockwise local mean shading value as a threshold when obtaining a value for the pixel.

9. A method as in claim 4 additionally comprising the following:
 compressing the output image.

10. A method as in claim 4 wherein the method is performed by a processor and firmware.

11. A method as in claim 4 wherein the method is performed by an application specific integrated circuit (ASIC).

12. A computer readable medium that stores instructions for performance of a method for transforming an input image to produce an output image, the method comprising the following:
 (a) performing a first threshold process in which a local activity measure is calculated for each pixel of the input image, wherein performance of the first threshold process results in a first representation of the input image;
 (b) performing a second threshold process in which for each pixel of the input image a local mean value for a block of pixels that contain the pixel is used as a threshold, wherein performance of the second threshold.process results in a second representation of the input image; and,
 (c) combining the first representation of the input image and the second representation of the input image to produce the output image.

13. A computer readable medium as in claim 12 wherein the method additionally comprises the following step performed before step (a) and step (b):
 filtering portions of the input image detected as halftone image to remove undesired halftone textures.

14. A computer readable medium as in claim 12 wherein step (a) includes the following performed for each pixel of the input image:
 obtaining, for the pixel, a local difference between a shading value for the pixel and output from a lowpass filter that filters a matrix of pixels that includes the pixel, the local difference being the local activity measure for the pixel; and,
 comparing the local activity measure for the pixel with a threshold value to obtain a value for the pixel.

15. A computer readable medium as in claim 12 wherein step (b) includes the following substep:
 obtaining, for each block of pixels, a blockwise local mean shading value; and,
 for every pixel within each block of pixels, using the blockwise local mean shading value as a threshold when obtaining a value for the pixel.

16. A system comprising:
 a first threshold module that performs a first threshold process on all pixels of an input image to produce a first representation of the input image;
 a second threshold module that performs a second threshold process on all pixels of the input image to produce a second representation of the input image; and,
 a combining module that combines the first representation of the input image and the second representation of the input image to produce a combined output image of the input image.

17. A system as in claim 16 wherein the system additionally comprising:
 a filter that filters portions of the input image detected as halftone regions to remove undesired halftone textures, the filter performing filtering on the input image before forwarding the input image to the first threshold module and the second threshold module.

18. A system as in claim 16 wherein the first threshold module obtains, for each pixel of the input image, a local difference between a shading value for the pixel and output from a lowpass filter that filters a matrix of pixels that includes the pixel, the local difference being compared with a threshold value to obtain a value for the pixel.

19. A system as in claim 16:
 wherein the second threshold module obtains, for each block of pixels, a blockwise local mean shading value; and,
 wherein for every pixel within each block of pixels, the second threshold module uses the blockwise local mean shading value as a threshold when obtaining a value for the pixel.

20. A system as in claim 16 wherein the system is a digital sender.

21. A system as in claim 16 wherein the system is a scanner.

22. A system as in claim 16 wherein the system is a fax machine.

23. A system comprising:
first threshold means for performing a first threshold process resulting in a first representation of the input image;
second threshold means for performing a second threshold process, wherein performance of the second threshold process results in a second representation of the input image; and,
combining means for combining the first representation of the input image and the second representation of the input image to produce a combined output image of the input image.

24. A system as in claim 23 wherein the system additionally comprising:
a filter means for filtering portions of the input image detected as halftone regions to remove undesired halftone textures, the filter means performing filtering on the input image before forwarding the input image to the first threshold means and the second threshold means.

25. A system as in claim 23 wherein the first threshold means obtains, for each pixel of the input image, a local difference between a shading value for the pixel and output from a lowpass filter that filters a matrix of pixels that includes the pixel, the local difference being compared with a threshold value to obtain a value for the pixel.

26. A system as in claim 23:
wherein the second threshold means obtains, for each block of pixels, a blockwise local mean shading value; and,
wherein for every pixel within each block of pixels, the second threshold means uses the blockwise local mean shading value as a threshold when obtaining a value for the pixel.

27. A system as in claim 23 wherein the combining means performs a logical AND operation when combining the first representation of the input image and the second representation of the input image to produce a combined output image of the input image.

28. A computer readable medium that stores instructions for performance of a method for transforming an input image to produce an output image, the method comprising the following:
(a) detecting first pixels occurring at edges within the input image, the edges including edges of graphics and text within the input image and not including uniform fill and background within the graphics;
(b) detecting second pixels that are part of text within the input image; and,
(c) combining the first pixels and the second pixels to produce the output image so that the output image includes the text and the edges of graphics but excludes uniform fill and background within the graphics.

29. A computer readable medium as in claim 28, wherein step (a) includes performing a threshold process in which a local activity measure is calculated for each pixel of the input image.

30. A computer readable medium as in claim 28, wherein step (b) includes performing a threshold process in which for each pixel of the input image a local mean value for a block of pixels that contain the pixel is used as a threshold.

31. A device for transforming an input image to produce an output image, the device comprising:
first detecting means for detecting first pixels occurring at edges within the input image, the edges including edges of graphics and text within the input image and not including uniform fill and background within the graphics;
second detecting means for detecting second pixels that are part of text within the input image; and,
combining means for combining the first pixels and the second pixels to produce the output image so that the output image includes the text and the edges of graphics but excludes uniform fill and background within the graphics.

32. A device as in claim 31 wherein the first detecting means performs a threshold process in which a local activity measure is calculated for each pixel of the input image.

33. A device as in claim 31 wherein the second detecting means performs a threshold process in which for each pixel of the input image a local mean value for a block of pixels that contain the pixel is used as a threshold.

* * * * *

UNITED STATES PATENT AND TRADEMARK OFFICE
CERTIFICATE OF CORRECTION

| | | |
|---|---|---|
| PATENT NO. | : 7,312,898 B2 | Page 1 of 1 |
| APPLICATION NO. | : 10/285100 | |
| DATED | : December 25, 2007 | |
| INVENTOR(S) | : Guotong Feng et al. | |

It is certified that error appears in the above-identified patent and that said Letters Patent is hereby corrected as shown below:

In column 3, line 11, delete "(x>0)" and insert -- ($x \geq 0$) --, therefor.

In column 6, line 9, in Claim 12, delete "." before "process".

Signed and Sealed this

Twenty-ninth Day of July, 2008

JON W. DUDAS
*Director of the United States Patent and Trademark Office*